(12) United States Patent
Schlosser et al.

(10) Patent No.: US 6,550,795 B1
(45) Date of Patent: Apr. 22, 2003

(54) SUSPENSION ALIGNMENT DEVICE

(75) Inventors: Kraig Schlosser, Columbia City, IN (US); Martin Blessing, Fort Wayne, IN (US); Mark Gunkel, Fort Wayne, IN (US)

(73) Assignee: Dana Corporation, Toledo, OH (US)

( * ) Notice: Subject to any disclaimer, the term of this patent is extended or adjusted under 35 U.S.C. 154(b) by 40 days.

(21) Appl. No.: 09/813,346

(22) Filed: Mar. 20, 2001

(51) Int. Cl.[7] ................................................ B60G 7/00
(52) U.S. Cl. ........................ 280/86.75; 280/124.116; 280/124.128; 411/539; 411/531; 403/83
(58) Field of Search .................... 411/539, 537, 411/540, 531; 403/83, 4; 280/86.75, 86.751, 86.753, 86.754, 86.755, 86.756, 724.116, 124.128

(56) References Cited

U.S. PATENT DOCUMENTS

| | | | |
|---|---|---|---|
| 3,960,388 A | 6/1976 | Strader et al. | ............. 280/693 |
| RE30,308 E | 6/1980 | Masser | ...................... 280/713 |
| 4,424,984 A | 1/1984 | Shiratori et al. | ............ 280/661 |
| 5,201,989 A | 4/1993 | Pierce | .......................... 280/68 |
| 6,131,930 A | 10/2000 | Chalin | ..................... 280/86.75 |

OTHER PUBLICATIONS

The Boler Company–Hendrickson Trailer Suspension Systems, "Quik–Align Alignment Procedure", 2 pages, (Jan. 17, 1995).

*Primary Examiner*—Paul N. Dickson
*Assistant Examiner*—Ruth Ilan
(74) *Attorney, Agent, or Firm*—Dykema Gossett PLLC

(57) ABSTRACT

A vehicle suspension and alignment device therefor is provided. The suspension includes a suspension control arm connected to an axle of the vehicle and having one end pivotally connected to a bracket extending from a frame of the vehicle. The end of the control arm is capable of rotation about a first axis extending transverse to the longitudinal direction of the vehicle. The suspension further includes a thrust washer disposed between one wall of the bracket and the end of the suspension control arm and a fastener that extends through the bracket, the washer, and the end of the suspension control arm. The washer is configured for engagement by a tool used to rotate the washer and cause movement of the suspension control arm relative to the bracket to thereby align the suspension and a vehicle axle.

19 Claims, 2 Drawing Sheets

SUSPENSION ALIGNMENT DEVICE

BACKGROUND OF THE INVENTION

1. Field of the Invention

This invention relates to vehicle suspensions and, in particular, to a device used for alignment of a vehicle suspension and axle.

2. Disclosure of Related Art

In a conventional vehicle suspension system, a suspension control arm has a first end rigidly connected to an axle of the vehicle and a second end pivotally connected to a bracket descending from the vehicle frame. The second end of the control arm may terminate in a bushing. The bracket generally includes first and second spaced walls that receive the bushing therebetween. A fastener extends through the first wall of the bracket, through the bushing, and through the second wall of the bracket. The fastener may also extend through one or more washers disposed on either side of the bushing between the first and second walls of the bracket. A nut is used to secure the fastener in place relative to the bracket and the control arm pivots about the fastener.

Conventional suspension systems must be aligned in a fore-aft direction to adjust the fore-aft position of the axle relative to the vehicle frame and thereby align the wheels that are supported on the axle. Improper alignment may lead to premature tire wear among other problems. In most conventional suspension systems, alignment is achieved by moving the control arm relative to the bracket descending from the frame. Each of the spaced walls of the bracket generally includes an elongated slot having a major axis that is parallel to the longitudinal direction of the vehicle. The fastener upon which the control arm pivots is moved within these slots to cause corresponding movement in the suspension control arm and axle. In some conventional suspension systems, a weld collar is disposed about the fastener and the position of the collar is adjusted to move the fastener. The collar is then welded to the frame bracket once proper alignment is achieved. These conventional systems are disadvantageous because realignment of the suspension and axle requires removal of the existing welds and the installation of new welds—a process that requires a relatively large amount of time. In other conventional suspension systems, an eccentric cam is disposed about the fastener and the cam is guided by one or more guides on the frame bracket. Rotation of the cam causes displacement of the fastener within the slots of the frame bracket and thereby adjusts the alignment of the suspension and axle. Although these latter systems enable the suspension to be realigned in a relatively short period of time, the systems require additional components and machining of existing suspension components thereby increasing the cost, weight, and complexity of the suspension.

There is thus a need for a vehicle suspension that will minimize or eliminate one or more of the above-mentioned deficiencies.

SUMMARY OF THE INVENTION

The present invention provides a vehicle suspension and, in particular, a thrust washer for use in aligning the vehicle suspension.

A suspension for a vehicle in accordance with the present invention includes a suspension control arm connected to an axle of the vehicle and having one end pivotally connected to a bracket extending from a frame of the vehicle. The end of the control arm is capable of rotation about a first axis extending transverse to the longitudinal direction of the vehicle. The inventive suspension further includes a thrust washer disposed between on wall of the bracket and the end of the suspension control arm and a fastener that extends through the bracket, the washer, and the end of the suspension control arm. In accordance with the present invention, the washer is configured for engagement by a tool used to rotate the washer and cause movement of the suspension control arm relative to the bracket. The washer has a body that defines a first aperture disposed about the first axis and configured to receive the fastener. The washer body further includes a second aperture disposed about a second axis remote from, and parallel to, the first axis. The second aperture is configured to receive a pivot member about which the washer rotates responsive to movement of the tool. Rotation of the washer causes movement of the fastener within the bracket and enables alignment of the suspension and axle.

A suspension in accordance with the present invention has several advantages as compared to conventional suspension systems. First, the inventive system does not require the installation or removal of welds during the alignment process and, therefore, requires less time for realignment of the suspension as compared to many conventional systems. Second, the inventive system uses an existing component of most suspension systems—a thrust washer—to enable alignment of the suspension. As a result, the inventive system weighs less than most conventional systems, is less costly, and is less complex.

These and other features and objects of this invention will become apparent to one skilled in the art from the following detailed description and the accompanying drawings illustrating features of this invention by way of example.

DETAILED DESCRIPTION OF THE PREFERRED EMBODIMENT

Figure 1:
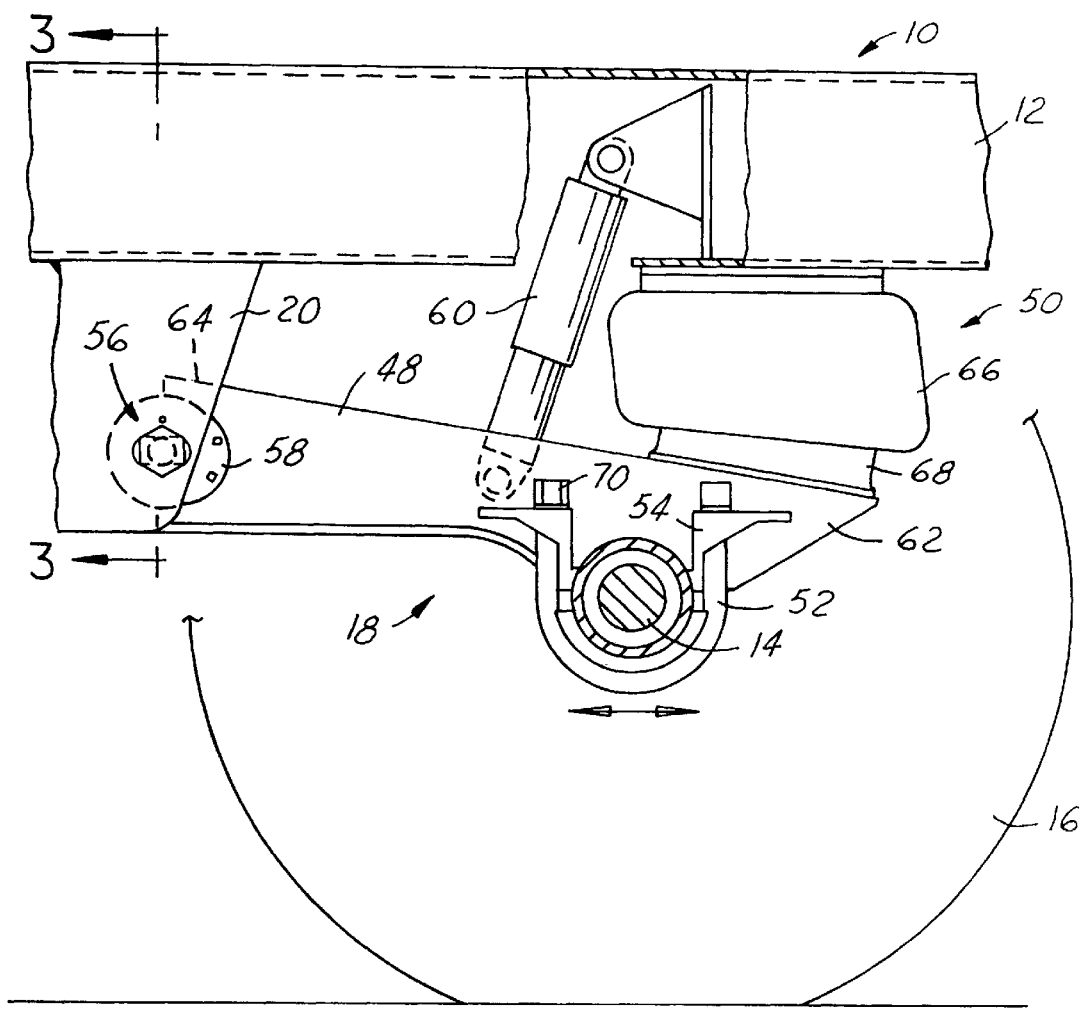
FIG. 1 is a side plan view of a vehicle suspension in accordance with the present invention.

Referring now to the drawings wherein like reference numerals are used to identify identical components in the various views, FIG. 1 illustrates a portion of a vehicle 10. Vehicle 10 may include a frame 12, one or more axles 14, wheels 16, and a suspension 18 in accordance with the present invention. In the illustrated embodiment, vehicle 10 comprises a semi-trailer. It should be understood, however, that the present invention may find application in a wide variety of vehicles.

Frame 12 provides structural support to the body of vehicle 10. Frame 12 is conventional in the art and may be made from conventional metals and metal alloys such as steel. Frame 12 may include a pair of longitudinal rails (only one of which is shown in FIG. 1) and cross-members as is conventional in the art. Frame 12 may also include a plurality of mounting brackets, such as bracket 20, for mounting various components of vehicle 10 including suspension 18.

Figure 2:
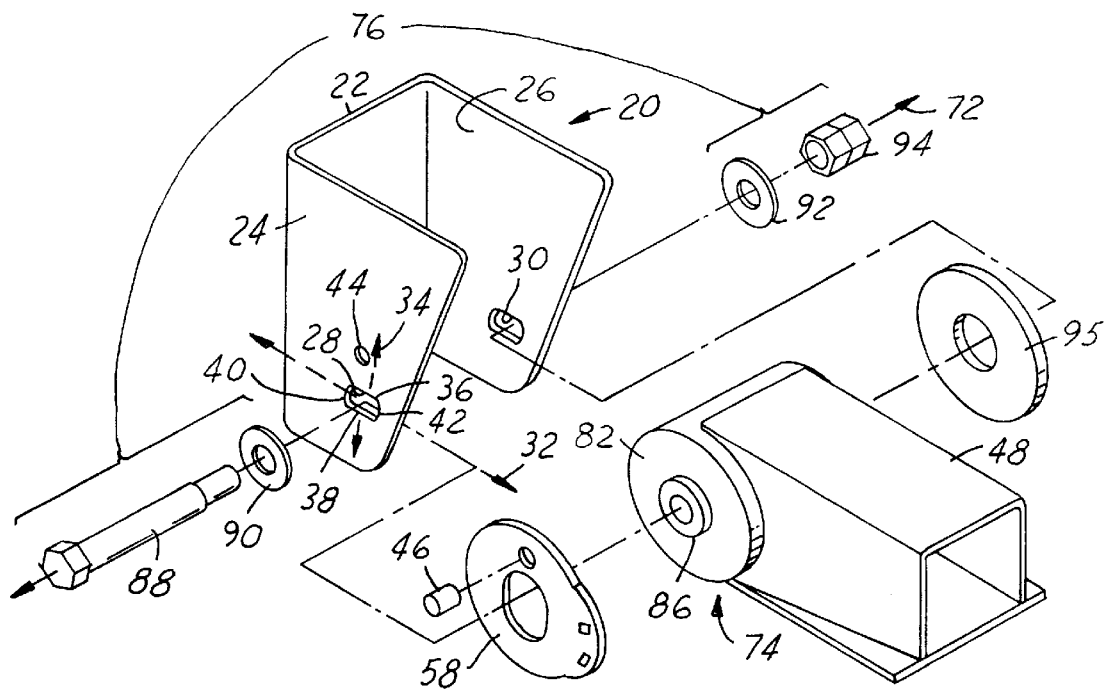
FIG. 2 is an exploded perspective view of a portion of the suspension of FIG. 1.

Referring to FIG. 2, bracket 20 will be described in greater detail. Bracket 20 is provided to pivotally mount suspension 18 to frame 12 and is conventional in the art. Bracket 20 includes a center wall 22 and a pair of spaced sidewalls 24, 26 and may be welded to or integral with frame 12. Sidewalls 24, 26 include aligned, elongated slots 28, 30 that enable fore-aft alignment of suspension 18 and axle 14. Slots 28, 30 each have a major axis 32 that is generally parallel to the longitudinal direction of vehicle 10 and a minor axis 34 that is generally perpendicular to the longitudinal direction of vehicle 10 (only one set of axes being illustrated in FIG. 2). Each of slots 28, 30 may have a flat portion 36, 38 on either side of major axis 32 and a curved portion 40, 42 on either side of minor axis 34. One of sidewalls 24, 26 (the outboard sidewall 24 as illustrated in FIG. 1) may further include an aperture 44 sized to receive a pivot member 46 for a purpose described hereinbelow.

Referring again to FIG. 1, axle 14 is provided to support frame 12 on wheels 16 and also provides mounting surfaces for various suspension and brake components. Axle 14 is conventional in the art and may be made from conventional metals and metal alloys such as steel. Axle 14 extends in a transverse direction relative to vehicle 10 and may support one or more wheels 16 on each end.

Wheels 16 are provided to support vehicle 10 and are also conventional in the art. Wheels 16 are supported for rotation on each end of axle 14 and include tires mounted thereon.

Suspension 18 is provided to couple axle 14 to frame 12 and to allow for movement of axle 14 relative to frame 12. In the illustrated embodiment only one suspension assembly is shown. It should be understood, however, that a similar assembly may be disposed at the opposite end of axle 14 on the other side of vehicle 10. Suspension 18 may include a control arm 48, a spring assembly 50, means, such as U-bolt 52 and bracket 54, for mounting arm 48 to axle 14, and means, such as mounting assembly 56, for pivotally mounting arm 48 to frame 12. In accordance with the present invention, suspension 18 also includes a thrust washer 58 that functions as a suspension alignment device. It will be understood that suspension 18 may also include other conventional suspension elements, such as shock absorber 60, that are not described in detail herein.

Control arm 48 provides a structural framework for suspension 18 and movably couples axle 14 to frame 12. Arm 48 is conventional in the art and may be made from conventional metals and metal alloys such as steel. In the illustrated embodiment, arm 48 comprises a conventional overslung trailing arm construction. It should be understood by those in the art, however, that the inventive alignment device may be used in suspensions having a wide variety of control arms. One end 62 of arm 48 (the rearward end in the illustrated embodiment) may provide a mounting surface for spring assembly 50. Another end 64 of arm (the forward end in the illustrated embodiment) is received within sidewalls 24, 26 of bracket 20 and is pivotally mounted to bracket 20 by mounting assembly 56, as described in greater detail hereinbelow.

Spring assembly 50 is provided to dampen movement of frame 12 responsive to variations in the surface over which vehicle 10 is traveling. Spring assembly 50 is conventional in the art. In the illustrated embodiment, assembly 50 comprises a conventional air spring 66 incorporating a piston 68 that controls air pressure within spring 66. Piston 68 is mounted to end 62 of arm 48 in abutting relation with spring 66. It should be understood by those in the art that a variety of known configurations for air or mechanical springs could be used without departing from the spirit of the present invention.

U-bolt 52 and bracket 54 are provided to fixedly couple control arm 48 to axle 14 and are conventional in the art. U-bolt 52 is disposed about axle 14 and its ends are received in bracket 54 and secured thereto using nuts 70. Bracket 54 may be welded to arm 48 or integral with arm 48. It should be understood by those in the art that arm 48 may be coupled to axle 14 in a variety of ways without departing from the spirit of the present invention. For example arm 48 may be welded to axle 14 or may be coupled to axle 14 using a variety of clamps that are disposed about axle 14 and if coupled together.

Figure 3:
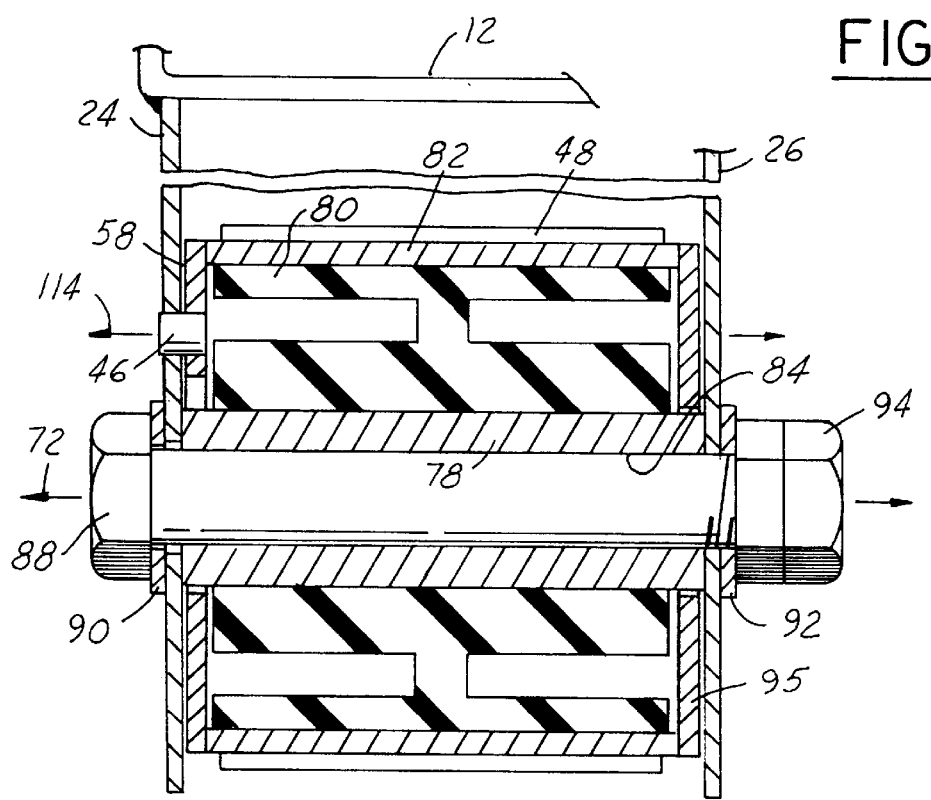
FIG. 3 is a cross-sectional view of a portion of the suspension of FIG. 1 taken along lines 3—3.

Referring now to FIGS. 2 and 3, mounting assembly 56 is provided to couple suspension 18 to frame 12 and to allow pivotal motion of end 64 of control arm 48 about an axis 72 (best shown in FIG. 2) extending transverse to the longitudinal direction of vehicle 10. Mounting assembly 56 may include a bushing 74 and a fastener assembly 76.

Bushing 74 is provided to allow rotation of arm 48 about a fastener of fastener assembly 76. Bushing 74 is conventional in the art and is generally affixed to, or disposed within, end 64 of control arm 48. Referring to FIG. 3, bushing 74 includes a sleeve 78 that may be made from metal or metal alloys and further includes an elastomeric material 80 such as rubber disposed about sleeve 78. Bushing 74 may also include a housing 82 disposed radially outwardly of the metal sleeve 78 and elastomeric material 80. Sleeve 78 of bushing 74 includes a throughbore 84 that is sized to receive a fastener of assembly 76. Sleeve 78 may define a boss 86 at either end that extends outwardly from bushing 74.

Fastener assembly 76 is provided to secure end 64 of control arm 48 to bracket 20. Assembly 76 may include a fastener 88, washers 90, 92, and a nut 94. Fastener 88 may comprise a screw, bolt, pin, or other conventional fastener. Fastener 88 extends through slot 28 in sidewall 24 of bracket 20, through washer 58 (as discussed in greater detail hereinbelow), through bushing 74 and through slot 30 in sidewall 26 of bracket 20. Fastener 88 may then be secured in place using washers 90, 92 and nut 94 in a conventional manner.

Referring to FIGS. 2 and 3, thrust washer 58 is provided to limit movement of end 64 of control arm 48 along axis 72 resulting from transverse loads placed on suspension 18. In accordance with the present invention, however, washer 58 is also provided as a means for aligning suspension 18 and axle 14. Referring to FIG. 2, washer 58 is disposed between sidewall 24 of bracket 20 and end 64 of control arm 48. A conventional washer 95 may be disposed between sidewall 26 of bracket 20 and end 64 of control arm 48. Washer 58 may be disposed on the outboard side of arm 48 to enable easy access to washer 58 and alignment of suspension 18 and axle 14. Alternatively, however, washer 58 may be disposed on the inboard side of arm 48 (with washer 95 disposed on the outboard side of arm 48) or washers 58 may be disposed on both the outboard and inboard sides of arm 48 (with one of the washers 58 replacing washer 95).

Figure 4:
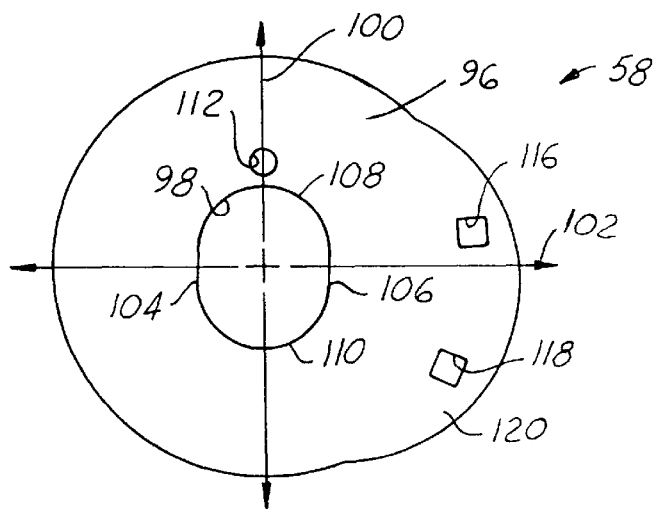
FIG. 4 is a plan view of a thrust washer of the suspension of FIG. 1.

Referring now to FIG. 4, washer 58 has a body 96 that may be generally circular in construction. It should be understood, however, that the size, shape, and configuration of body 96 may vary responsive to design considerations associated with bracket 20, control arm 48, and mounting assembly 76. Body 96 includes an aperture 98 that is configured to received fastener 88 and may be sized relative to fastener 88 or boss 86 of bushing 74. In the illustrated embodiment, aperture 98 is elongated. The shape of aperture 98, however, may vary. In particular, aperture 98 may be circular in shape provided the diameter of aperture 98 has sufficient clearance relative to fastener 88 or boss 86 to allow some movement of fastener 88 or boss 86 within aperture 98 during alignment of suspension 18 and axle 14. Aperture 98 includes a major axis 100 and a minor axis 102 with a flat portion 104, 106 on either side of major axis 100 and a curved portion 108, 110 on either side of minor axis 102.

Body 96 further includes another aperture 112 sized to receive pivot member 46 extending through sidewall 24 of bracket 20. Referring to FIGS. 2 and 3, pivot member 46 may comprise a pin. It should be understood, however, that pivot member 46 may comprise a screw or bolt or any of a variety of conventional structures that will allow washer 58 to rotate relative to sidewall 24 of bracket 20. Aperture 112 may be circular in shape. Aperture 112 may be disposed proximate aperture 98 and may be intersected by major axis 100 of aperture 98. As illustrated in FIG. 3, aperture 112 may be disposed about an axis 114 that is remote from the axis 72 that extends through aperture 98 upon installation of washer 58. Further, axis 114 may be is remote from the center of body 96.

Body 96 further includes means for allowing engagement of body 96 by a tool (not shown) to allow rotation of body 96 about pivot member 46. In the illustrated embodiment, the engagement means comprises one or more recesses 116, 118 formed in a flange 120 that extends radially outwardly from body 96. It should be understood, however, that a variety of structures may be provided to allow engagement of body 96 by conventional tools. For example, one or more projections may extend from flange 120 of body 96 that are received or grasped by a tool or flange 120 itself may be configured in such a way as to allow a tool to grip flange 120. Recesses 116, 118 are square in cross-section. It should be understood, however, that the shape of recesses 116, 118 may vary.

Referring to FIGS. 1 and 2, a method for aligning a vehicle suspension 18 and axle 14 in accordance with the present invention will be described. The method includes the step of providing a thrust washer 58 having a body 96 with apertures 98, 112 configured to receive a fastener 88 of the suspension 18 and a pivot member 46 and configured for engagement by a tool to allow rotation of the washer 58. The method may further include the steps of inserting fastener 88 through aperture 28 in sidewall 24 of bracket 20, aperture 98 of washer 58, throughbore 84 of bushing 74, and aperture 30 of sidewall 26 of bracket 20 and securing fastener 88 using washers 90, 92 and/or nut 94. Finally, the method may include the steps of engaging washer 58 with a tool (not shown) and rotating washer 58 about pivot member 46 to cause fore-aft movement of fastener 88 within apertures 28, 30 of sidewalls 24, 26 of bracket 20 and thereby align suspension 18 and axle 14.

A suspension 18 and alignment device 58 in accordance with the present invention represents a significant improvement as compared to conventional suspension systems. First, the inventive system does not require the installation or removal of welds during the alignment process and, therefore, requires less time for realignment of the suspension as compared to many conventional systems. Second, the inventive system uses an existing component of most suspension systems—a thrust washer—to enable alignment of the suspension. As a result, the inventive system weighs less than most conventional systems, is less costly, and is less complex.

While the invention has been particularly shown and described with reference to the preferred embodiments thereof, it is well understood by those skilled in the art that various changes and modifications can be made in the invention without departing from the spirit and scope of the invention.

What is claimed is:

1. A thrust washer for a vehicle suspension, comprising:
   a body having a first aperture configured to receive a fastener extending through one end of a control arm of said suspension and a second aperture configured to receive a pivot member;
   wherein said body has a flange extending radially outwardly therefrom and said flange is configured for engagement by a tool for rotation of said body on said pivot member to thereby allow alignment of said suspension; and
   wherein said first aperture is elongated, said first aperture having a major axis and a minor axis and said first aperture having a curved portion on each side of said minor axis and a straight portion on each side of said major axis.

2. The washer of claim 1, wherein said major axis extends through said second aperture.

3. The washer of claim 1 wherein said body includes a recess configured to receive said tool.

4. The washer of claim 1 wherein said body includes a plurality of recesses configured to receive said tool.

5. The washer of claim 1 wherein said body has a flange extending therefrom, said flange configured for engagement by said tool.

6. A suspension for a vehicle, comprising:
   a suspension control arm connected to an axle of said vehicle and having an end pivotally connected to a bracket extending from a frame of said vehicle;
   a thrust washer disposed between one wall of said bracket and said end of said suspension control arm; and
   a fastener extending through said bracket, said washer, and said end of said suspension control arm
   wherein said washer is configured for engagement by a tool used to rotate said washer and cause movement of said suspension control arm relative to said bracket.

7. The suspension of claim 6 wherein said end of said control arm includes a bushing having a boss extending therefrom, said boss received within an aperture in said washer.

8. The suspension of claim 6 wherein said washer includes an aperture through which said fastener extends, said aperture elongated and having a major axis and a minor axis and said aperture having a curved portion on each side of said minor axis and a straight portion on each side of said major axis.

9. The suspension of claim 6 wherein said washer includes a first aperture through which said fastener extends and a second aperture configured to receive a pivot member about which said washer rotates.

10. The suspension of claim 6 wherein said washer includes a recess configured to receive said tool.

11. The suspension of claim 6 wherein said washer includes a plurality of recesses configured to receive said tool.

12. The suspension of claim 6 wherein said washer has a flange extending therefrom, said flange configured for engagement by said tool.

13. A suspension for a vehicle, comprising:
   a suspension control arm connected to an axle of said vehicle and having an end pivotally connected to a bracket extending from a frame of the vehicle for rotation about a first axis;

a thrust washer disposed between one wall of said bracket and said end of said suspension control arm; and a fastener extending along said first axis and through said bracket, said washer, and said end of said suspension control arm wherein said washer is configured for engagement by a tool used to rotate said washer about a second axis remote from said first axis and cause movement of said suspension control arm relative to said bracket.

14. The suspension of claim 13 wherein said end of said control arm includes a bushing having a boss extending therefrom, said boss received within an aperture in said washer.

15. The suspension of claim 13 wherein said washer includes an aperture through which said fastener extends, said aperture elongated and having a major axis and a minor axis and said aperture having a curved portion on each side of said minor axis and a straight portion on each side of said major axis.

16. The suspension of claim 13 wherein said washer includes a first aperture through which said fastener extends and a second aperture through which a pivot member extends, said second aperture disposed about said second axis and said washer configured for rotation about said pivot member.

17. The suspension of claim 13 wherein said washer includes a recess configured to receive said tool.

18. The suspension of claim 13 wherein said washer includes a plurality of recesses configured to receive said tool.

19. The suspension of claim 13 wherein said washer has a flange extending therefrom, said flange configured for engagement by said tool.

* * * * *